(12) United States Patent
Kanungo et al.

(10) Patent No.: US 12,361,931 B2
(45) Date of Patent: Jul. 15, 2025

(54) SYSTEM AND METHOD FOR DEEP MACHINE LEARNING MODEL USING PERSONAL DATA IN REAL TIME

(71) Applicant: Samsung Electronics Co., Ltd., Suwon-si (KR)

(72) Inventors: Tapas Kanungo, Redmond, WA (US); Qingxiaoyang Zhu, Woodland, CA (US); Nehal A. Bengre, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 18/192,363

(22) Filed: Mar. 29, 2023

(65) Prior Publication Data

US 2024/0071376 A1     Feb. 29, 2024

Related U.S. Application Data

(60) Provisional application No. 63/400,472, filed on Aug. 24, 2022.

(51) Int. Cl.
*G10L 15/18*     (2013.01)
*G10L 15/06*     (2013.01)
(Continued)

(52) U.S. Cl.
CPC ........ *G10L 15/1815* (2013.01); *G10L 15/063* (2013.01); *G10L 15/197* (2013.01);
(Continued)

(58) Field of Classification Search
USPC ..................................................... 704/1–504
See application file for complete search history.

(56) References Cited

U.S. PATENT DOCUMENTS 9,305,544 B1     4/2016 Petrov et al.
10,242,667 B2 *  3/2019 Sharma .................. G06N 3/044
(Continued)

FOREIGN PATENT DOCUMENTS

KR     10-2006-0125949 A    12/2006
KR        10-1434515 B1     8/2014
WO    WO-2024043563 A1 *    2/2024 ........... G10L 15/063

OTHER PUBLICATIONS

International Search Report and Written Opinion of the International Searching Authority dated Nov. 20, 2023, in connection with International Application No. PCT/KR2023/011273, 7 pages.

*Primary Examiner* — Marcus T Riley

(57) ABSTRACT

A method includes receiving, by at least one processing device of an electronic device, an utterance provided by a user. The method also includes delexicalizing at least a portion of the utterance using a named entity database stored on the electronic device to create an encoded utterance. The method further includes transmitting the encoded utterance to a server on which a language model is stored. The method also includes receiving an intent and one or more slots associated with the utterance, where at least one slot of the one or more slots is a representative tag. The method further includes identifying a named entity corresponding to the at least one slot based on the named entity database. In addition, the method includes performing an action based on the intent and the one or more slots.

20 Claims, 8 Drawing Sheets

(51) Int. Cl.
  *G10L 15/197* (2013.01)
  *G10L 15/22* (2006.01)
  *G10L 15/30* (2013.01)

(52) U.S. Cl.
  CPC .............. *G10L 15/22* (2013.01); *G10L 15/30* (2013.01); *G10L 2015/223* (2013.01)

(56) References Cited

U.S. PATENT DOCUMENTS

| | | | |
|---|---|---|---|
| 10,867,599 B2 * | 12/2020 | Rastogi | G10L 15/197 |
| 10,902,846 B2 * | 1/2021 | Kim | G10L 15/22 |
| 10,978,056 B1 * | 4/2021 | Challa | G06N 5/025 |
| 11,074,909 B2 * | 7/2021 | Lee | G10L 15/26 |
| 11,790,899 B2 * | 10/2023 | Rastogi | G10L 15/18 |
| | | | 704/232 |
| 2018/0068031 A1 * | 3/2018 | Hewavitharana | G06F 9/30156 |
| 2020/0320988 A1 * | 10/2020 | Rastogi | G10L 15/22 |
| 2020/0410989 A1 * | 12/2020 | Ray | G06F 40/216 |
| 2021/0074279 A1 * | 3/2021 | Rastogi | G10L 15/22 |
| 2021/0089620 A1 * | 3/2021 | Finkelshtein | G06F 40/216 |
| 2022/0019743 A1 * | 1/2022 | Ouyang | G06F 40/237 |
| 2022/0067030 A1 * | 3/2022 | Jiao | G06N 3/084 |
| 2022/0199079 A1 * | 6/2022 | Hanson | H04L 51/02 |
| 2022/0230629 A1 * | 7/2022 | Zhu | G10L 15/02 |
| 2023/0419960 A1 * | 12/2023 | Rastogi | G10L 15/197 |
| 2024/0071376 A1 * | 2/2024 | Kanungo | G10L 15/1815 |

\* cited by examiner

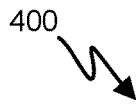

```
User Utterance:  set  a  reminder  to  call      Joe     at  7  pm
BIO Utterance:    O   O     O      O   O       B-PER     O   O   O
Delexicalized Utterance: set  a  reminder  to  call _PERSON_ at  7  pm
```

FIG. 4A

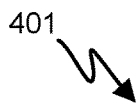

```
User Utterance:     if  I  call     Mike     in   California   at  6  pm
BIO Utterance:      O   O   O      B-PER     O     B-LOC       O   O   O
Delexicalized Utterance: if  I  call _PERSON_ in _LOCATION_    at  6  pm
```

FIG. 4B

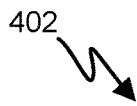

```
User Utterance:  his  time  be  set  a  meeting  with    Hongbin
BIO Utterance:    O    O    O   O   O    O        O         O
Delexicalized Utterance: his time be set a meeting with _PERSON_
```

FIG. 4C

| Annotated Utterance | Meta Information |
|---|---|
| Set a reminder to call Joe at 7 pm | |
| Set a reminder to call _MASK1_ at 7 pm | _MASK1_: Joe |
| [intent: reminder_setting] set a reminder to call <person> _MASK1_ </person> at <time> 7 pm </time> | _MASK1_: Joe |
| [intent: reminder_setting] set a reminder to call <person> Joe </person> at <time> 7 pm </time> | |

FIG. 7

SYSTEM AND METHOD FOR DEEP MACHINE LEARNING MODEL USING PERSONAL DATA IN REAL TIME

CROSS-REFERENCE TO RELATED APPLICATION AND PRIORITY CLAIM

This application claims priority under 35 U.S.C. § 119(e) to U.S. Provisional Patent Application No. 63/400,472 filed on Aug. 24, 2022, which is hereby incorporated by reference in its entirety.

TECHNICAL FIELD

This disclosure relates generally to machine learning systems. More specifically, this disclosure relates to a system and method for a deep machine learning model using personal data in real time.

BACKGROUND

In existing voice assistants, identifying intent and slots for a user utterance correctly in real-time is a fundamental problem. Modern systems now use deep learning techniques like Bidirectional Encoder Representations from Transformers (BERT) to identify the intent and slots for an utterance. However, deep learning models like BERT are biased towards the demographics in the pre-training textual data. Existing voice assistants also experience issues in recognizing foreign names or device names, which is a major cause for user dissatisfaction.

SUMMARY

This disclosure relates to a system and method for a deep machine learning model using personal data in real time.

In a first embodiment, a method includes receiving, by at least one processing device of an electronic device, an utterance provided by a user. The method also includes delexicalizing, by the at least one processing device, at least a portion of the utterance using a named entity database stored on the electronic device to create an encoded utterance. The method further includes transmitting, by the at least one processing device using a communications interface of the electronic device, the encoded utterance to a server on which a language model is stored. The method also includes receiving, by the at least one processing device using the communications interface, an intent and one or more slots associated with the utterance, where at least one slot of the one or more slots is a representative tag. The method further includes identifying, by the at least one processing device, a named entity corresponding to the at least one slot based on the named entity database. In addition, the method includes performing, by the at least one processing device, an action based on the intent and the one or more slots.

In a second embodiment, an electronic device includes at least one processing device configured to receive an utterance provided by a user. The at least one processing device is also configured to delexicalize at least a portion of the utterance using a named entity database stored on the electronic device to create an encoded utterance. The at least one processing device is further configured to transmit, using a communications interface of the electronic device, the encoded utterance to a server on which a language model is stored. The at least one processing device is also configured to receive, using the communications interface, an intent and one or more slots associated with the utterance, where at least one slot of the one or more slots is a representative tag. The at least one processing device is further configured to identify a named entity corresponding to the at least one slot based on the named entity database. In addition, the at least one processing device is configured to perform an action based on the intent and the one or more slots.

In a third embodiment, a non-transitory machine readable medium contains instructions that when executed cause at least one processor of an electronic device to receive an utterance provided by a user. The non-transitory machine readable medium also contains instructions that when executed cause the at least one processor to delexicalize at least a portion of the utterance using a named entity database stored on the electronic device to create an encoded utterance. The non-transitory machine readable medium further contains instructions that when executed cause the at least one processor to transmit, using a communications interface of the electronic device, the encoded utterance to a server on which a language model is stored. The non-transitory machine readable medium also contains instructions that when executed cause the at least one processor to receive, using the communications interface, an intent and one or more slots associated with the utterance, where at least one slot of the one or more slots is a representative tag. The non-transitory machine readable medium further contains instructions that when executed cause the at least one processor to identify a named entity corresponding to the at least one slot based on the named entity database. In addition, the non-transitory machine readable medium contains instructions that when executed cause the at least one processor to perform an action based on the intent and the one or more slots.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 4A through 4C illustrate example user utterances in accordance with this disclosure;

FIG. 7 illustrates example stages of an utterance during the inferencing process of FIG. 6 in accordance with this disclosure;

DETAILED DESCRIPTION

Figure 1:
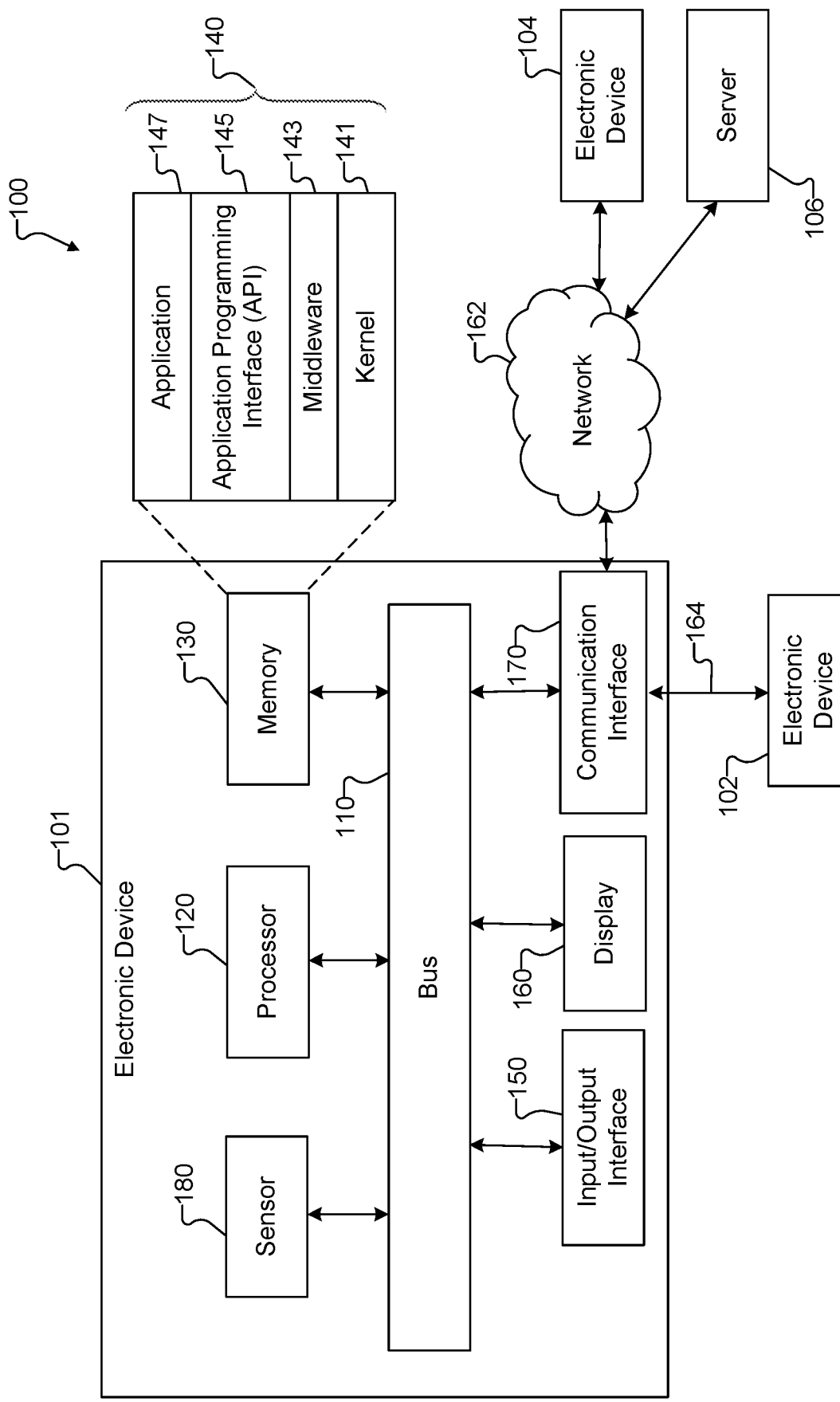
FIG. 1 illustrates an example network configuration including an electronic device in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, in existing voice assistants, identifying intent and slots for a user utterance correctly in real-time is a fundamental problem. Modern systems now use deep learning techniques like Bidirectional Encoder Representations from Transformers (BERT) to identify the intent and slots for an utterance. However, deep learning models like BERT are biased towards the demographics in the pre-training textual data. Existing voice assistants also experience issues in recognizing foreign names or device names, which is a major cause for user dissatisfaction. In some cases, users may be able to add names that are important to them into a personal database (PDB) including contact names, device names, etc., hoping that the voice assistant will now understand the contact names. However, this instead often leads to a bad user experience because deep learning models cannot be updated in real-time to recognize such entities. Typically, deep learning model training time during fine-tuning takes too long, such as on the order of minutes, and thus a system cannot immediately leverage new personal information after each PDB update.

This disclosure provides a deep learning model, which may be referred to as a Masked Entity Model-based Bidirectional Encoder Representations from Transformers (MEM-BERT) model. The deep learning model is trained to understand a template of entities it is detecting within a language context, not just the lexical or surface form. This allows the model to learn that, after a specific sequence of words, a specific slot type typically appears, not just a specific name string. Once the model learns a language model using slot types (or de-lexicalized slots), given an input utterance and based on the learned model, a voice assistant can leverage personal database information immediately after it is updated in real-time. Furthermore, the system and method of this disclosure mitigate privacy concerns since contact database information is not sent outside the electronic device, such as to external servers.

In various embodiments, a random Masked-Entity-Modeling and fine-tuning technique is used that allows the deep learning model to learn both a surface form language model as well as a delexicalized language model simultaneously. An encoder delexicalizes entities in a personal information database, which can also be referred to here as a named entities database, that allows for updated entities in the personal information database to be recognized in real time. This avoids retraining the deep learning model since it already knows the delexicalized language model. In some embodiments, the personal information database can also include regular expressions for description of the delexicalized form, which the encoder can use to convert entities into delexicalized forms.

The deep learning model of this disclosure thus allows for contacts and other personal information like device names with type information to be leveraged to identify intent and slots. The deep learning model also allows for other personal information expressed as regular expressions to be leveraged for entity and slot identification. The deep learning model can leverage this information in real time so that a user experiences an immediate recognition accuracy improvement when adding a new entity, such as a new contact, into a personal information database. In various embodiments, this is performed without sending personal information to servers or other external destinations.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may receive and process inputs (such as audio inputs and or other input utterances received from an input device like a microphone) and perform delexicalization on at least a portion of the utterance using a named entity database stored on the electronic device 101, such as in the memory 130, to create an encoded utterance including one or more masked entities. The processor 120 may also, using the communications interface 170, transmit the encoded utterance to a server on which a language model is stored and receive an intent and one or more slots associated with the utterance from the server, where at least one slot can be a representative tag or token. The processor 120 may further identify a named entity corresponding to at least one slot using the named entity database. The processor 120 may also instruct one or more other devices to perform certain operations (such as outputting audio using an audio output device like a speaker) or display content on one or more displays 160. In addition, the processor 120 may receive inputs such as data samples to be used in training one or more machine learning models and manage such training by inputting the samples to the machine learning model(s), receiving outputs from the machine learning model(s), and executing one or more learning functions (such as one or more loss functions) to improve the machine learning model(s).

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications supporting the receipt of input utterances, delexicalization of the utterances using a named entity database to create encoded utterances each including one or more masked entities, transmission of the encoded utterances to a server on which a language model is stored, receipt of an intent and one or more slots associated with each utterance from the server, identification of a named entity corresponding to at least one slot using the named entity database for each utterance, and execution of one or more tasks related to the content of each utterance. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in this disclosure, the server 106 may store a trained language model, receive encoded utterances, and transmit an intent and one or more slots associated with each utterance, such as to electronic device 101, where at least one slot can be a representative tag or token. In some embodiments, the server 106 may receive and process inputs (such as audio inputs or data received from an audio input device like a microphone) and perform delexicalization and named entity identification processes. The server 106 may also receive inputs, such as data samples to be used in training one or more machine learning models, and manage such training by inputting the samples to the machine learning model(s), receiving outputs from the machine learning model(s), and executing one or more learning functions (such as one or more loss functions) to improve the machine learning model(s).

Although FIG. 1 illustrates one example of a network configuration 100 including an electronic device 101, various changes may be made to FIG. 1. For example, the network configuration 100 could include any suitable number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
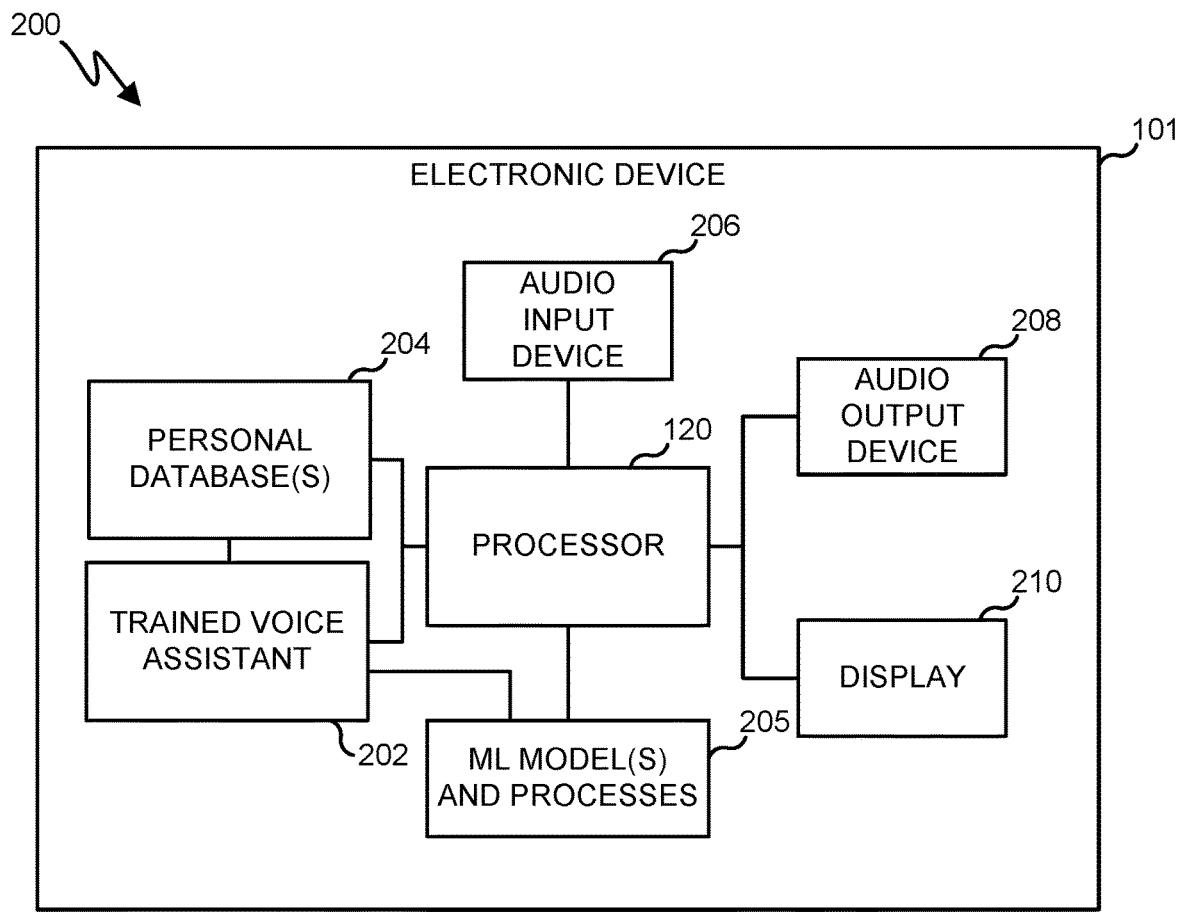
FIG. 2 illustrates an example system for processing user utterances using personal data in accordance with this disclosure.

FIG. 2 illustrates an example system 200 for processing user utterances using personal data in accordance with this disclosure. For ease of explanation, the system 200 is described as being implemented on or supported by the electronic device 101 in the network configuration 100 of FIG. 1. However, the system 200 may be used with any other suitable device(s) and in any other suitable system(s).

As shown in FIG. 2, the system 200 includes the electronic device 101, which includes the processor 120. The system 200 also includes a trained voice assistant 202 and at least one personal database 204. The processor 120 is operatively coupled to or otherwise configured to use the voice assistant 202, which may include or be associated with one or more machine learning language models or processes 205 that facilitate audio data and utterance processing and understanding for use in identifying entities and planning and triggering actions to be performed by the electronic device 101. For example, the machine learning models or processes 205 can include (but are not limited to) a wake word detector model trained to recognize one or more wake words or phrases, a speaker verification model trained to determine whether an utterance is uttered by a verified speaker, a false-trigger mitigation model trained to analyze acoustic features of the audio data in order to predict whether the user intended to trigger wake up of the voice assistant 202 or if the utterance was a random utterance, a delexicalization and annotation model or process that delexicalizes, encodes, and/or masks portions of utterances using the personal database(s) 204 for further processing by another language model (such as the MEM-BERT language model described in this disclosure), a relexicalization model or process that relexicalizes one or more portions of an utterance after the utterance is processed by a language model, and/or an action planning model or process that creates an action plan that defines one or more actions to be performed by the electronic device 101 based on the utterance(s) received and processed by the voice assistant 202. It will be understood that the voice assistant 202 and the machine learning models and processes 205 can be stored in at least one memory of the electronic device 101 (such as the memory 130) and accessed by the processor 120 to perform one or more automated speech recognition tasks or other tasks. However, the voice assistant 202 and the machine learning models and processes 205 can be stored in any other suitable manner.

The system 200 also includes an audio input device 206 (such as a microphone), an audio output device 208 (such as a speaker or headphones), and a display 210 (such as a screen or a monitor like the display 160). The processor 120 can receive an audio input from the audio input device 206 and provide the audio input to the trained voice assistant 202. The processor 120, with the trained voice assistant 202 and using the machine learning models or processes 205 included in or associated with the voice assistant 202, can retrieve one or more named entities from the personal database(s) 204 and can delexicalize one or more words or phrases included in utterances found in the audio input data.

Figure 3:
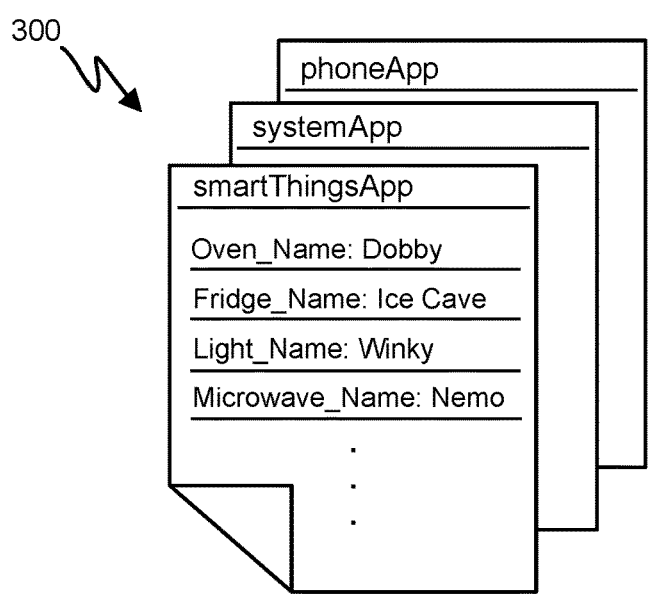
FIG. 3 illustrates example data categories or records that can be included in a personal database in accordance with this disclosure.

As an example of this, FIG. 3 illustrates example data categories or records 300 that can be included in the personal database 204 in accordance with this disclosure. The example data categories 300 in FIG. 3 can be database records for specialized application categories that have stored in association therewith information germane to each specialized application. For example, FIG. 3 illustrates that the specialized application categories include a smart things application category, a system application category, a phone application category, etc. These example specialized applications can understand and execute commands given by a user in the respective topic domains. For instance, the smart things application category includes Internet of Things (IoT) device names (such as personalized device names for devices like ovens, refrigerators, light or illumination devices, microwaves, thermostats, and so on), the system application category includes system commands performable on the electronic device 101 (such as opening or initializing a particular application). Also, the phone application category includes information related to contacts and making phone calls, such as names and/or addresses of people in one or more contact lists. The personal database thus contains personalized information with respect to each of these applications. It will be understood that the named entity categories included in FIG. 3 are examples only, and the personal database could include information associated with other or additional applications of the electronic device 101 or another device(s) or information organized in other or additional types of categories, such as music applications, mapping and navigation applications, shopping applications, and so on. In various embodiments of this disclosure, a user can add named entities to the personal database 204, such as via text entry, a verbal command, a data or file import process (such as importing a contact data file), or other processes.

The information included in the personal database 204 can be used by the electronic device 101, via the voice assistant 202 and/or the machine learning models and processes 205, to create encoded and masked utterances by replacing portions of utterances with delexicalized tags or tokens. As examples, FIGS. 4A through 4C illustrate example user utterances in accordance with this disclosure. In FIG. 4A, an example of a user utterance 400 is depicted in (i) an original state, (ii) a state represented using Beginning, Inside, Outside (BIO) annotation, and (iii) a delexicalized state. In this example, an utterance received by the electronic device 101 includes "set a reminder to call Joe at 7 pm." As shown in FIG. 4A, a named entity can be delexicalized and masked using the personal database 204, and the utterance can be tagged by replacing the named entity with a representative tag or token. In some cases, this can be accomplished by querying the personal database 204 for "Joe," finding "Joe" in a contacts list for a phone application in the personal database 204, replacing "Joe" in the utterance with a mask based on "Joe" being a contact within the contacts list, and tagging the utterance with a representative tag or token such as "_PERSON_" as shown in FIG. 4A. In various embodiments of this disclosure, a separate dictionary (such as a lookup table) can be maintained, at least during processing of the particular utterance, with an entry of "<_PERSON_, Joe>" that can be later used for relexicalization as described in this disclosure.

In FIG. 4B, another example of a user utterance 401 is depicted in (i) an original state, (ii) a state represented using BIO annotation, and (iii) a delexicalized state. In this example, an utterance received by the electronic device 101 includes "if I call Mike in California at 6 pm." This example shows that utterances that do not include a direct command from the user can still be delexicalized by the system 200 in various embodiments. Additionally, as shown in FIG. 4B, multiple named entities can be delexicalized and masked using the personal database 204, and the utterance can be tagged by replacing each named entity with a representative tag or token. In some cases, this can be accomplished by querying the personal database 204 for "Mike," finding "Mike" in a contacts list for a phone application in the personal database 204, masking "Mike" in the utterance based on "Mike" being a contact within the contacts list, and tagging the utterance with a representative tag or token such as "_PERSON_" as shown in FIG. 4B. Similarly, the processor 120 can query the personal database for "California," find "California" as a location in a contacts list for a phone application or other application (such as a navigation application) in the personal database 204, mask "California" in the utterance based on "California" being found within the contacts list, and tag the utterance with a representative tag or token such as "_LOCATION_" as shown in FIG. 4B. In various embodiments of this disclosure, a separate dictionary (such as a lookup table) mapping masks to entities can be maintained, at least during processing of the particular utterance, with entries of "<_PERSON_, Mike>" and "<_LOCATION_, California>" that can be later used for relexicalization as described in this disclosure.

In FIG. 4C, yet another example of a user utterance 402 is depicted in (i) an original state, (ii) a state represented using BIO annotation, and (iii) a delexicalized state. In this example, an utterance received by the electronic device 101 includes "his time be set a meeting with Hongbin." This example thus shows that utterances that may not be entirely grammatically correct can still be recognized by the voice assistant and associated machine learning models and that named entities that are foreign names can be delexicalized using the personal database 204. As shown in FIG. 4C, a named entity of "Hongbin" can be delexicalized and masked using the personal database 204, and the utterance can be tagged by replacing the named entity with a representative tag or token. In some cases, this can be accomplished by querying the personal database 204 for "Hongbin," finding "Hongbin" in a contacts list for a phone application in the personal database 204, masking "Hongbin" in the utterance based on "Hongbin" being a contact within the contacts list, and tagging the utterance with a representative tag such as "_PERSON_" as shown in FIG. 4C. In various embodiments of this disclosure, a separate dictionary can be maintained, at least during processing of the particular utterance, with an entry of "<_PERSON_, Hongbin>" that can be later used for relexicalization as described in this disclosure.

It will be understood that similar processes can be performed for various named entity types, such as IoT device names, location names, movie titles, song titles, music artist names, etc. It will also be understood that the personal database 204 can be populated with various information and in various ways. Additionally, it will be understood that various other representative tag types, such as "_DEVICE-NAME_" or "_SONGTITLE_", can be used, depending on the utterance provided and the information included in the personal database 204.

Returning to FIG. 2, delexicalizing an utterance serves to provide an encoded and masked utterance that includes the delexicalized entity or entities to a language model, such as a language model executed on another device like the server 106, to obtain one or more intents and one or more slot tags for the utterance. The processor 120, using the voice assistant 202, the personal database 204, and potentially the machine learning models and processes 205, can relexicalize the delexicalized portions of the utterance and create an action plan for executing one or more actions performable by the electronic device 101 (and its associated applications) and/or by at least one other device. That is, once the processor 120 has access to the intent of the utterance and the slot(s) for item(s) such as one or more named entities included in the utterance, the processor 120 can construct an action plan and, using the action plan, instruct at least one action of the electronic device 101 or of another device or system that corresponds to one or more instructions or requests provided in the utterance.

As a particular example, suppose an utterance "set a reminder to call Joe at 7 pm" is received from a user via the audio input device 206. The processor 120 can create an action plan that indicates the processor 120 should use an alarm application to set an alarm that will trigger at 7 pm with a textual label of "call Joe." As another particular example, suppose an utterance "call mom" is received from a user via the audio input device 206. Here, the processor 120 can create an action plan that indicates the processor 120 should instruct the audio output device 208 to output "calling Mom" and to cause a phone application or other communication application to begin a communication session with a "mom" contact stored on the electronic device 101. Using the personal database 204 and delexicalization as described in this disclosure can be particularly advantageous when a named entity is not easily identified by automated speech recognition (ASR) models or other language models, such as foreign names (like contact names, artist names, or movie titles) or personalized IoT device names. For example, suppose an utterance "start Dobby at 8 pm at 425 degrees" is received from a user via the audio input device 206. Here, the processor 120 can determine from the personal database 204 that "Dobby" is the personalized name for the user's smart oven device, create an encoded utterance using delexicalization, receive an intent and slot tags for the utterance, and create an action plan that indicates the processor 120 should instruct the smart oven device to preheat to 425 degrees at 8 pm.

Although FIG. 2 illustrates one example of a system 200 for processing user utterances using personal data, various changes may be made to FIG. 2. For example, the audio input device 206, the audio output device 208, and the display 210 can be connected to the processor 120 within the electronic device 101, such as via wired connections or circuitry. In other embodiments, the audio input device 206, the audio output device 208, and/or the display 210 can be external to the electronic device 101 and connected via one or more wired or wireless connections. Also, in some cases, the voice assistant 202 and the machine learning models or processes 205 can be stored as separate models or processes called upon by the processor 120 to perform certain tasks or can be included in and form a part of one or more larger machine learning applications. Further, in some embodiments, one or more of the voice assistant 202 and the machine learning models or processes 205 can be stored remotely from the electronic device 101, such as on the server 106. Here, the electronic device 101 can transmit requests including inputs (such as captured audio data) to the server 106 for processing of the inputs using the machine learning models and processes, and the results can be sent back to the electronic device 101. In addition, in some embodiments, the electronic device 101 can be replaced by the server 106, in which case the server 106 would receive audio inputs from a client device and transmit instructions back to the client device to execute functions associated with instructions included in the utterances. Although FIG. 3 illustrates one example of data categories or records that can be included in a personal database 204 and FIGS. 4A through 4C illustrate examples of user utterances, various changes may be made to FIGS. 3 and 4A through 4C. For instance, any other or additional data categories or records may be included in a personal database 204, and any other or additional types of user utterances may be obtained and processed.

Figure 5:
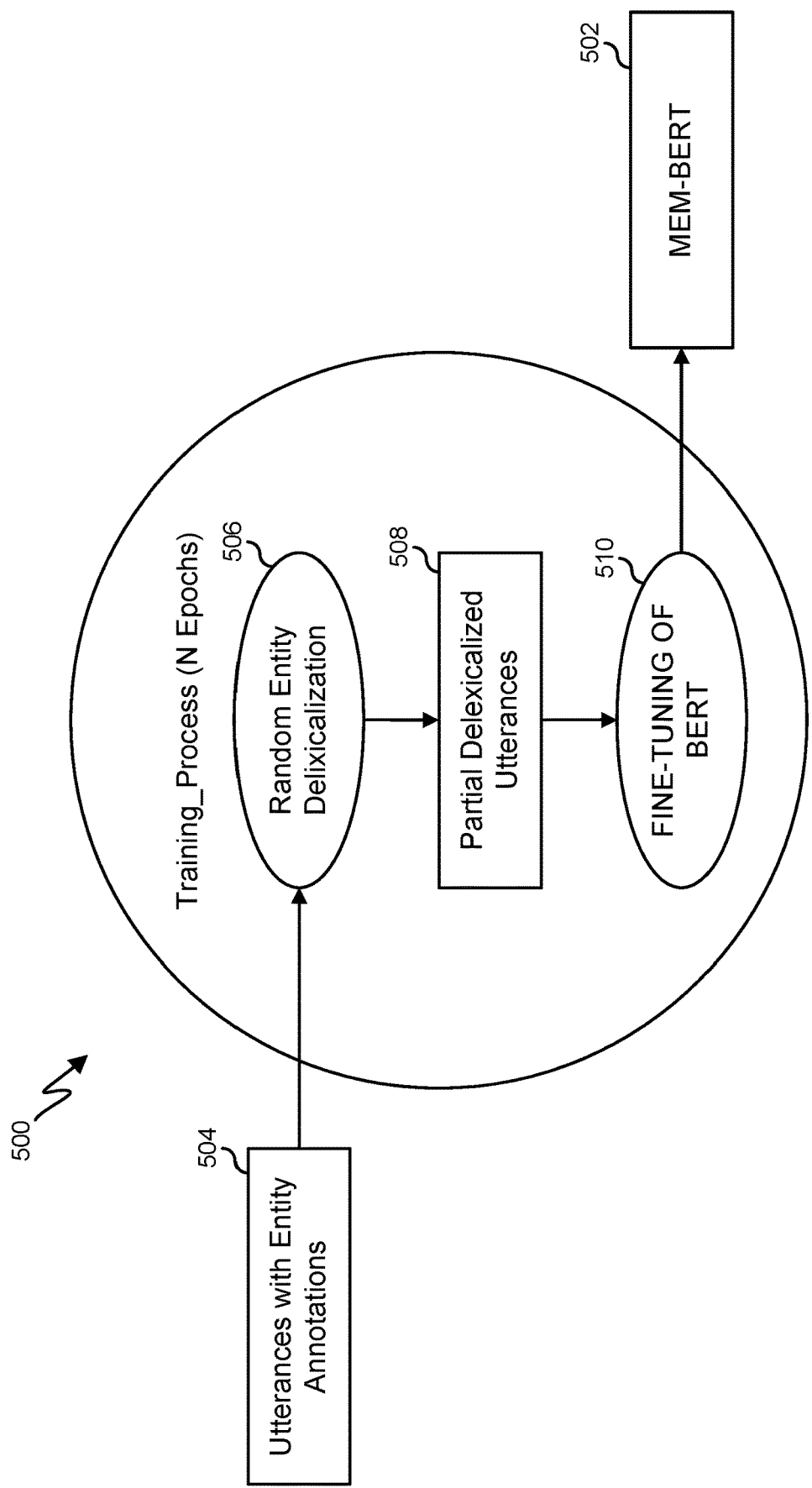
FIG. 5 illustrates an example training process for a deep machine learning model in accordance with this disclosure.

FIG. 5 illustrates an example training process 500 for a deep machine learning model in accordance with this disclosure. For ease of explanation, the process 500 is described as being implemented on or supported by the server 106 in the network configuration 100 of FIG. 1. However, the process 500 may be used with any other suitable device(s) and in any other suitable system(s).

As shown in FIG. 5, the process 500 is generally used to produce a trained machine learning model 502. The machine learning model 502 can be a deep learning model, which may be referred to as a Masked Entity Model-based Bidirectional Encoder Representations from Transformers (MEM-BERT) model. The MEM-BERT model 502 is trained to understand a template of the entities it is detecting within a language context, not just the lexical or surface form. This allows the model 502 to learn not just a specific name string but also that, after a specific sequence of words, a specific slot type typically appears. Once the model 502 learns a language model using slot types and delexicalized slots, given an input utterance and based on the learned model, a voice assistant can leverage personal database information immediately after it is updated in real-time.

As also shown in FIG. 5, utterances with entity annotations 504 are provided for use in the process 500. For example, the utterances with entity annotations 504 can be used as at least part of a dataset to train and obtain the resulting MEM-BERT model 502. As a particular example, the utterances with entity annotations 504 can include annotations that indicate the ground truth types for named entities, such as location, person, or device name types or any other or additional type(s). A random entity delexicalization operation 506 is performed as part of the training process 500. The random entity delexicalization operation 506, with a probability, masks a ground truth entity or entities included within the utterances 504 with a corresponding entity type tag. The goal of the random entity delexicalization operation 506 is to create partially delexicalized utterances, such that each delexicalized utterance produced does not necessarily have every named entity included in the utterance replaced with a tag. For instance, an utterance including more than one named entity, such as the utterance "if I call Mike in California at 6 pm" (which includes both Mike, a person, and California, a location), may only have one named entity randomly selected for replacement, such as randomly selecting "Mike" and replacing "Mike" with a representative tag like "_PERSON_" while not replacing "California."

In some embodiments, in addition to the selection of which entity to replace being random, part of the random nature of the operation 506 can involve randomly choosing to replace one named entity or selecting multiple named entities to be replaced. For example, for the utterance "set a timer to call John and Kate who live in New York," the operation 506 may randomly choose to replace two named entities and then randomly choose which two entities to replace in the utterance, such as choosing to replace "John" and "New York" but not "Kate." The random nature of the operation 506 allows for the model 502 to be trained to learn the form of utterances with some context, even when not every entity in the utterance is delexicalized. It will be understood that the number of entities in a training utterance to be randomly masked can differ based on the described randomness and/or based on training presets selected for a particular environment. It will also be understood that different parameters can be set for masking entity types in accordance with this disclosure. For example, in some embodiments, the training process 500 can be configured to only mask one entity of one particular entity type in the utterances. As another example, in some embodiments, the training process 500 can be configured to select all entities of one type to be masked.

The operation 506 results in a set of partially delexicalized utterances 508. The partially delexicalized utterances 508 are used in the process 500 to fine-tune an existing language model, such as a language model pre-trained using world knowledge retrieved from a variety of network connected resources like a deep-learned transformer (such as a BERT model), in a fine-tuning operation 510 to produce the final trained model 502. The final trained MEM-BERT model 502 can thus recognize partially delexicalized utterances during inferencing. As shown in FIG. 5, various operations can be performed any number of times (or N epochs) until the final trained model 502 is achieved.

In various embodiments, the fine-tuning operation 510 determines an error or loss using a loss function and modifies the language model based on the error or loss. The outputs of the language model produced using the training input data 504, 508 can represent confidences, such as a similarity score, and can be provided to the loss function. The loss function calculates the error or loss associated with the language model's predictions. For example, when the outputs of the language model differ from the ground truths, the differences can be used to calculate a loss as defined by the loss function. The loss function may use any suitable measure of loss associated with outputs generated by the language model, such as a cross-entropy loss or a mean-squared error.

For instance, in various embodiments of this disclosure, a base model (such as a BERT model with its structure unchanged) is used as a test bed and a named entity recognition (NER) task is used as a down-streaming task. Inspired by the mask language model, a sequence of named entities is randomly masked with a special token (e.g., entities are masked in a person type as special token "_PERSON_" and entities in a location type are masked as special token "_LOCATION_"), which represents the named entity type (slot-type) of the delexicalized sequence, with a given probability. The probability of swapping the named entity sequence is tunable as a hyperparameter and the special token is added to the original model (such as BERT) tokenizer. In various embodiments, cross entropy loss is used as an objective function. The loss is calculated for all tokens in all utterances in a batch over a distribution of all possible slot category labels, which can be represented by the following:

$$\text{loss} = \sum_{i=1}^{tokens\_in\_batch} \sum_{n=1}^{N\_slot\_categories} y_{(slot\_pred,slot\_label)} \log(P_{slot\_pred,slot\_label})$$

The training of the language model can be determined to be complete when the language model is predicting intent and slot types at an acceptable accuracy level. For example, when the loss calculated by the loss function is larger than desired, the parameters of the language model can be adjusted. Once adjusted, the process 500 can move back to operation 506 to provide the same or additional training data to the adjusted language model, and additional outputs from the language model can be compared to corresponding ground truths so that additional losses can be determined using the loss function. Over time, the language model learns to produce more accurate outputs that more closely match the ground truths, and the measured loss becomes less. The amount of training data used can vary depending on the number of training cycles and may include large amounts of training data. At some point, the measured loss can drop below a specified threshold, the training of the language model can be completed, and the process 500 ends with providing the final trained model 502.

The training process 500 shown here can provide several advantages depending on the implementation. Typically, a deep-learned model such as BERT is trained on a masked language model, where lexical forms are masked and the model learns to predict the words. Such models learn only the lexical form of the language. However, the process 500 includes fine-tuning a language model to provide a new language model, such as the MEM-BERT model 502, by adding delexicalized forms of the utterances to the original training data using a corresponding masked entity prediction task for fine-tuning as described above and illustrated in FIG. 5. The process 500 thus causes the final model 502 to learn the language model both in lexical form as well as in delexicalized form. Additionally, training the model 502 in this way allows for new named entities to be added to the personal database 204 and to be recognized by the model 502 during inferencing without having to retrain or fine-tune the model 502 again to recognize the entity. Thus, new entities can be added to allow the voice assistant 202 to leverage, in real-time, personal database information immediately after the personal database is updated.

Although FIG. 5 illustrates one example of a training process 500 for a deep machine learning model, various changes may be made to FIG. 5. For example, although described above as being performed on the server 106, the training process could be performed by another device or performed using a distributed architecture. For instance, the process 500 could be executed on a client electronic device (such as the electronic device 101) if practical storage or computing resources permit. In some cases, one electronic device may provide the utterances with entity annotations 504, and another electronic device can receive the utterances with entity annotations 504 and perform the operations 506, 510. The resulting trained model 502 could be stored on the original electronic device that provided the utterances with entity annotations 504, on the electronic device that performed operations 506, 510, or on yet another electronic device. It will be understood that the processor 120, whether as part of the electronic device 101 or server 106, can execute the training process 500.

Additionally, although the example process 500 illustrated in FIG. 5 shows fine-tuning a BERT model to obtain an MEM-BERT model, other language models could be trained in a similar fashion without departing from the scope of this disclosure. For example, fine-tuning of a Generative Pretrained Transformer (GPT) model may be performed to create a Masked Entity Model-based GPT (MEM-GPT) model. Moreover, the model could be trained using a plurality of different human languages. In addition, while shown as a series of operations, various operations in FIG. 5 could overlap, occur in parallel, occur in a different order, or occur any number of times.

Figure 6:
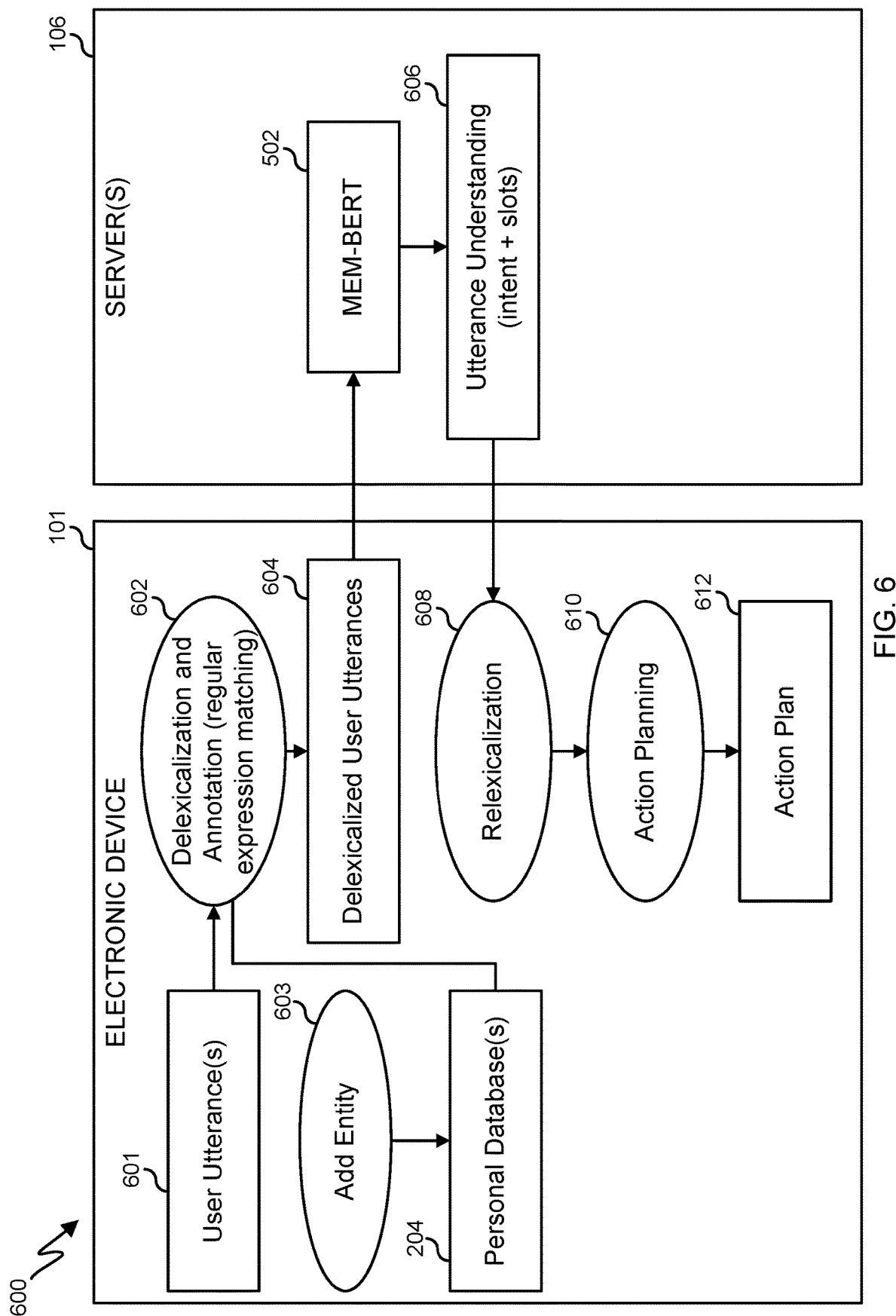
FIG. 6 illustrates an example inferencing process in accordance with this disclosure.

FIG. 6 illustrates an example inferencing process 600 in accordance with this disclosure. For ease of explanation, the process 600 is described as being implemented on or supported by the electronic device 101 and the server 106 in the network configuration 100 of FIG. 1. However, the process 600 may be used with any other suitable device(s), including a single device or a combination of devices, and in any other suitable system(s).

As shown in FIG. 6, the process 600 includes the electronic device 101 receiving one or more user utterances 601, such as via the audio input device 206. A delexicalization and annotation operation 602 takes as input the one or more user utterances 601 and, consulting the personal database(s) 204, delexicalizes each utterance by querying the personal database(s) 204 for the named entities included in the utterance and annotating the original utterance by replacing any named entity in the utterance with an entity mask. The operation 602, as described in this disclosure, can be performed by an encoder executed by a voice assistant application (such as the voice assistant 202) or by another model, process, or application associated with a voice assistant application. In various embodiments of this disclosure, a user can add named entities to the personal database 204 using an optional entity addition operation 603. The user can provide entity information for new entities not currently in the personal database 204 in various ways, such as via text entry, a verbal command, a data or file import process (such as importing a contact data file), or other processes. In some cases, whenever new data is added with respect to other applications on the device (such as contacts, songs, device names, etc.), the entity addition operation 603 updates the personal database(s) 204 with each new entity and the corresponding entity type of the new entity. Also, in some cases, the electronic device 101, such as via the voice assistant, can recognize at some point during the process 600 that an utterance likely includes a new entity and prompt the user to decide whether to add the new entity to the personal database 204.

Thus, the user utterances 601 are pre-processed using the personalized data in the personal database 204, and matching entities are replaced/delexicalized by corresponding entity type tags or tokens to create one or more delexicalized user utterances 604. In some embodiments, the personal database 204, in addition to or instead of including strings, can include regular expressions that identify lexicalized forms of entities. In such embodiments, in operation 602, the encoder uses a regular expression matching process and replaces these entities with their corresponding entity tag symbols. For example, the personal database 204 could include wildcards, such as Mich* to match any entity in utterances starting with "Mich" (like Michael or Michelle) and mask that named entity in the utterance.

As a particular example, FIG. 7 illustrates example stages of an utterance during the inferencing process 600 of FIG. 6 in accordance with this disclosure. In the example of FIG. 7, an input utterance 702 of "set a reminder to call Joe at 7 pm" is received by the electronic device 101. FIG. 7 further shows that, as a result of the delexicalization and annotation operation 602, a masked and delexicalized utterance 704 is encoded as "set a reminder to call _MASK1_ at 7 pm." As shown in FIG. 7, meta information 701 indicating that "_MASK1_" corresponds to "Joe" in the original utterance can be retained by the electronic device 101 in a separate dictionary, at least during the inferencing process 600, to allow the electronic device 101 to relexicalize the utterance after the delexicalized utterance 704 is processed by the server 106. Masking the named entities in this way also provides the benefit of retaining user privacy by avoiding sending personal information, such as names or locations, over a network to the server 106, since the delexicalized utterance sent to the server 106 instead includes a mask in place of each personal named entity.

Turning back to FIG. 6, during the inferencing process 600, the encoder replaces each named entity in the utterance that matches an entity in the personal database 204 with a symbol corresponding to the entity tag at operation 602. This delexicalizes the utterance to allow the trained deep learning model 502 stored at the server 106 to identify one or more intents and one or more slot types for the delexicalized user utterance 604. As shown in FIG. 6, the delexicalized utterances 604 are transmitted by the electronic device 101 to the server 106 for processing by the trained language model 502. The trained language model 502 recognizes one or more entity slots and their types, as well as one or more intents, for each delexicalized utterance transmitted to the server 106. The language model further annotates each utterance with the entity slot(s) and intent(s) in an operation 606, and the server 106 transmits each newly-annotated utterance back to the electronic device 101. The electronic device 101, in a relexicalization operation 608, replaces the lexical tags in each utterance received from the server 106 using the retained meta information. The relexicalization operation 608, as described in this disclosure, can be performed by an encoder executed by a voice assistant application (such as the voice assistant 202) or another model, process, or application associated with a voice assistant application. Since the trained language model 502 does not need to know the specific lexical form, it does not need to be retrained. This also allows for the personal database 204 to be updated in real-time to provide a user experience of instant learning of the user's personal data. Also, since the lexical form does not have to be sent to the server 106 for retraining, privacy issues can be mitigated.

As a particular example, turning back to FIG. 7, FIG. 7 shows an intent and slot tagged utterance 706 produced by the trained language model 502. The intent and slot tagged utterance 706 still includes the masked entity ("_MASK1_") but now, based on the context surrounding the masked entity, includes an intent and slot tags. In this example, the delexicalized utterance received by the trained language model 502 ("set a reminder to call _MASK1_ at 7 pm") is annotated by the trained language model 502 as "[intent: reminder_setting] set a reminder to call <person>_MASK1_</person> at <time> 7 pm </time>." This indicates that the user intent is to set a reminder, that the masked entity has a person slot type, and that "7 pm" has a time slot type. The intent and slot tagged utterance 706 provided by the server 106 is relexicalized in the relexicalization operation 608 to add the retained meta information back into the utterance for further processing by the voice assistant and/or associated models or processes. For example, as shown in FIG. 7, the utterance 706 is relexicalized by replacing the masked entity with the original entity name to provide a relexicalized utterance 708 of "[intent: reminder_setting] set a reminder to call <person> Joe </person> at <time> 7 pm </time>."

Turning back to FIG. 6, the electronic device 101 performs, using the relexicalized utterance created in the relexicalization operation 608, an action planning operation 610. The action planning operation 610 can include the electronic device 101 determining what action or actions to perform and under what parameter or parameters to perform the action(s) requested in the original user utterance 601. For example, for a relexicalized utterance of "[intent: reminder_setting] set a reminder to call <person> Joe </person> at <time> 7 pm </time>", the action planning operation 610 can create an action plan 612 that when executed causes the electronic device 101 to trigger a reminder at 7 pm with a textual label of "call Joe." Various actions can be executed in this manner based on the original user utterance 601 provided by a user without departing from the scope of this disclosure.

Although FIG. 6 illustrates one example of an inferencing process 600, various changes may be made to FIG. 6. For example, although described as being performed using both the electronic device 101 and the server 106, the process 600 could be performed using one of the electronic device 101 (such as when the trained language model 502 is stored on the electronic device 101) or the server 106 (such as when utterances are provided to the server 106 to handle all processing of the utterances described with respect to FIG. 6). For instance, although handling more of the process 600 by the server 106 could allow for personal information (such as people's names) to be sent to the server 106, alternative embodiments in which the server 106 handles portions of the process 600 (such as receiving utterances 601 from the electronic device 101 and performing the process 600 up to generating the action plan 612 and providing the action plan 612 to the electronic device 101) could reduce the processing power required by the electronic device 101. It will be understood that at least one processor 120, whether as part of the electronic device 101 and/or the server 106, can perform the inferencing process 600.

Moreover, although the example inferencing process 600 illustrated in FIG. 6 shows using a MEM-BERT model as the language model 502, other language models trained in accordance with this disclosure could be used without departing from the scope of this disclosure, such as by using a MEM-GPT model. Additionally, in some embodiments, instead of searching only the personal database 204 for named entities, the search could be performed using a larger database, such as a large knowledge base stored on the electronic device 101 or the server 106. For example, the knowledge base could be a routinely-updated knowledge base that contains various named entities learned over time and their entity types (such as movie titles, artist names, etc.) that are or become well-known and are added to the knowledge base using automated or manual processes. In addition, while shown as a series of operations, various operations in FIG. 6 could overlap, occur in parallel, occur in a different order, or occur any number of times.

Although FIG. 7 illustrates one example of stages of an utterance during the inferencing process 600 of FIG. 6, various changes may be made to FIG. 7. For example, it will be understood that the utterances 702-708 shown in FIG. 7, as well as the meta information 701, are examples only and that any other suitable utterances, as well as any other suitable types of meta information and any number of meta information (such as retaining more than one type of mask, like a person and a location) can be used in the various embodiments of this disclosure. Additionally, multiple entities of the same types can be included, such as the utterance 708 including tags such as <person1>, <person2>, and so on, depending on the content of the utterance.

Figure 8:
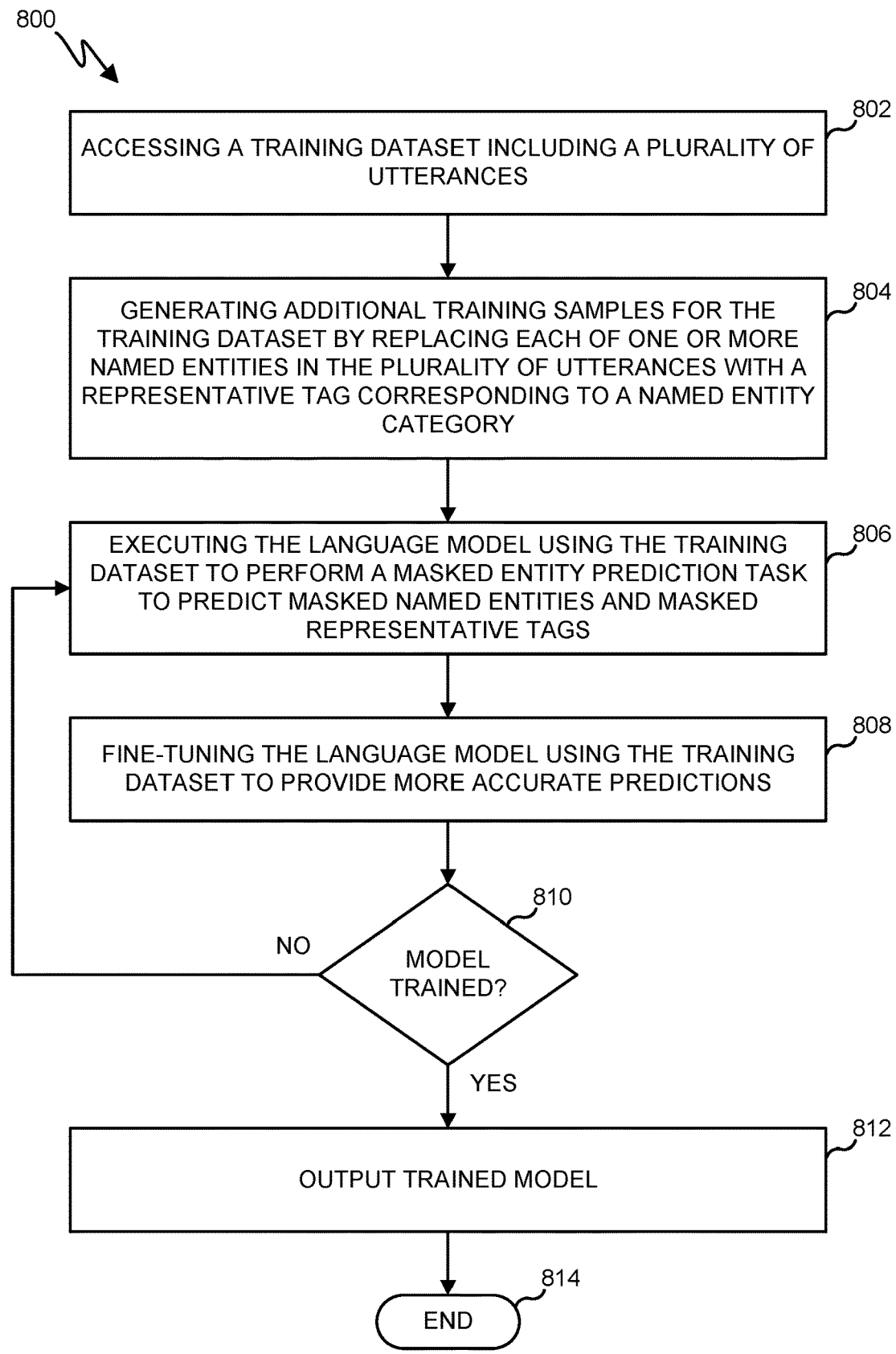
FIG. 8 illustrates an example method for using delexicalization to train a deep machine learning model in accordance with this disclosure.

FIG. 8 illustrates an example method 800 for using delexicalization to train a deep machine learning model in accordance with this disclosure. For ease of explanation, the method 800 shown in FIG. 8 is described as being performed using or supported by the server 106 in the network configuration 100 of FIG. 1. However, the method 800 may be used with any other suitable device(s), such as the electronic device 101, and in any other suitable system(s).

At block 802, a training dataset including a plurality of utterances is accessed. This can include, for example, the processor 120 of the server 106 controlling retrieval of the training dataset from a storage location on the server 106, on another server in the system, or from another device or system. In some cases, the plurality of utterances in the training dataset can include annotations that indicate the ground truth types for named entities, such as location, person, or device name types or any other or additional type(s). At block 804, additional training samples are generated for the training dataset. This can be done, for example, by the processor 120 performing a random entity delexicalization operation as described above with respect to FIG. 5 in order to mask at least one ground truth entity included within the training utterances with at least one representative tag corresponding to at least one named entity category. This updates the training dataset to include partially delexicalized utterances. In some embodiments, the named entity category is one of a plurality of categories such as at least of a person category, an object category, a location category, and/or a time category. Also, in some embodiments, the language model can be pre-trained with one or more datasets incorporating natural textual data derived from at least one network-connected resource.

At block 806, a language model is executed using the updated training dataset to perform a masked entity prediction task in order to predict masked named entities and masked representative tags in the training dataset. This can include, for example, the processor 120 executing the language model to predict representative tags to use for masked entities included in the partially delexicalized utterances and other utterances of the training dataset. Based on the predictions and the ground truths included in the training dataset, at block 808, the language model is fine-tuned to provide more accurate predictions. This can include, for example, the processor 120 determining an error or loss using a loss function and modifying the language model based on the error or loss. The outputs of the language model produced using the training input data can represent confidences, such as similarity scores, and can be provided to the loss function. The loss function can calculate the error or loss associated with the language model's predictions. For example, when the outputs of the language model differ from the ground truths, the differences can be used to calculate a loss as defined by the loss function. The loss function may use any suitable measure of loss associated with outputs generated by the language model, such as a cross-entropy loss or a mean-squared error.

At decision block 810, it is determined whether training of the language model is complete. For example, the training of the language model can be determined to be complete when the language model is predicting intents and slot types using the partially delexicalized utterances and other utterances of the training dataset at an acceptable accuracy level. When the loss calculated by the loss function is larger than desired, the parameters of the language model can be adjusted. Once adjusted, the method 800 can move back to block 806 to provide the same or additional training data to the adjusted language model, and additional outputs from the language model can be compared to the corresponding ground truths so that additional losses can be determined using the loss function. Ideally, over time, the language model produces more accurate outputs that more closely match the ground truths, and the measured loss becomes less. The amount of training data used can vary depending on the number of training cycles and may include large amounts of training data. At some point, the measured loss can drop below a specified threshold. At decision block 810, it can be determined that the training of the language model is complete. At block 812, the trained/fine-tuned language model is output to be used for inferencing processes, where the trained language model is able to output embedding vectors representing encoded utterances and identify an intent and one or more slots associated with each utterance. The method 800 ends at block 814.

Although FIG. 8 illustrates one example of a method 800 for using delexicalization to train deep machine learning model, various changes may be made to FIG. 8. For example, while shown as a series of steps, various steps in FIG. 8 could overlap, occur in parallel, occur in a different order, or occur any number of times. As a particular example, the method 800, after decision block 810, could loop back to block 802 or 804, depending on whether the generation of additional training samples at block 804 produced a sufficient plurality of delexicalized samples or if just one utterance or a small number of utterances from the training dataset is delexicalized at block 804 and more delexicalized training utterances are needed.

Figure 9:
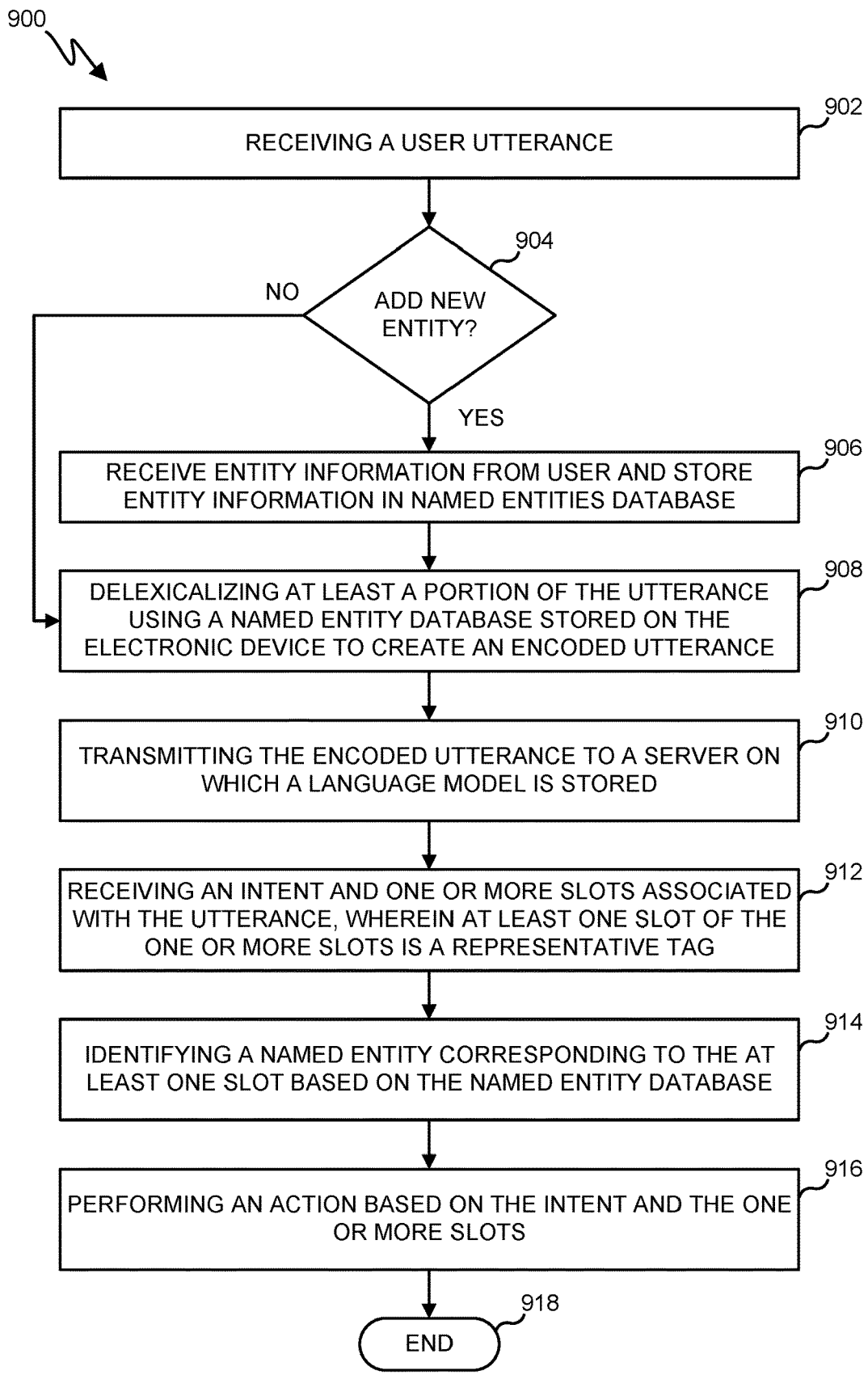
FIG. 9 illustrates an example method for using personal data and delexicalization with a deep machine learning model in accordance with this disclosure.

FIG. 9 illustrates an example method 900 for using personal data and delexicalization with a deep machine learning model in accordance with this disclosure. For ease of explanation, the method 900 shown in FIG. 9 is described as being performed using or supported by the electronic device 101 in the network configuration 100 of FIG. 1. However, the method 900 could be performed using any other suitable device(s), such as the server 106, and in any other suitable system(s).

At block 902, a user utterance is received. This can include, for example, the processor 120 of the electronic device 101 receiving an utterance provided by a user to the electronic device 101, such as via an audio input device. In various embodiments of this disclosure, a user can add named entities to a named entities database (such as the personal database 204) using an optional entity addition process. At decision block 904, it is determined whether any new named entities are to be added to the named entities database. For example, the processor 120 can control the electronic device 101 to receive entity information from a user for a new entity not currently in the name entities database in various ways, such as via text entry, a verbal command, a data or file import process (such as importing a contact data file), or other processes. If it is determined that a new entity is to be added to the named entity database, at block 906, new entity information is received from the user and added to the named entity database. In some cases, whenever new data is added with respect to other applications on the device, such as contacts, songs, device names, etc., the entity addition operation updates the named entities database with each new entity and the entity type of the new entity. Also, in some cases, the electronic device 101, such as via the voice assistant, can recognize that an utterance likely includes a new entity during the method 800, and the electronic device 101 can prompt the user to decide whether to add the new entity information to the named entity database.

At block 908, at least a portion of the utterance is delexicalized. This can include, for example, the processor 120 delexicalizing one or more portions of the utterance using the named entity database stored on the electronic device 101 to create an encoded utterance. In some embodiments, delexicalizing at least the portion of the utterance includes encoding, by the processor, the utterance by replacing each named entity in the utterance with a representative tag corresponding to a named entity category determined using the named entity database. Also, in some embodiments, the named entity database includes regular expressions for description of a plurality of named entities as described in this disclosure.

At block 910, the encoded utterance is transmitted to a server on which a language model is stored. This can include, for example, the processor 120 instructing transmission of the encoded utterance by the electronic device 101, such as via a communications interface of the electronic device 101, to the server 106 on which a language model (a trained language model such as MEM-BERT, MEM-GPT, etc.) is stored. In various embodiments, the language model is trained to output an embedding vector representing the encoded utterance for identifying the intent and the one or more slots associated with the utterance. At block 912, at least one intent and one or more slots associated with the utterance are received. This can include, for example, the processor 120 receiving, using the communications interface, the at least one intent and one or more slots associated with the utterance from the server 106, where at least one slot of the one or more slots is a representative tag.

At block 914, a named entity is identified. This can include, for example, the processor 120 identifying a named entity corresponding to the at least one slot based on the named entity database and/or based on a dictionary or lookup table including meta information for the previously delexicalized utterance created at block 908, and using this information to relexicalize the utterance, such as described with respect to FIG. 6. At block 916, at least one action based on the intent and one or more slots is performed. This can include, for example, the processor 120 creating an action plan, such as described with respect to FIG. 6, and performing one or more actions based on the intent and the one or more slots using the action plan and its associated parameters. The method 900 ends at block 918.

Although FIG. 9 illustrates one example of a method 900 for using personal data and delexicalization with a deep machine learning model, various changes may be made to FIG. 9. For example, while shown as a series of steps, various steps in FIG. 9 could overlap, occur in parallel, occur in a different order, or occur any number of times. As a particular example, the new entity addition process at blocks 904 and 906 may not occur during the method 900 or may occur prior to block 902, such as when a user independently updates personal data on the electronic device 101 (which in turn updates the named entity database) prior to receiving a user utterance at block 902.

Moreover, although described as being performed using the electronic device 101, portions of the method 900 could be performed by a server, such as the server 106. For instance, the utterance received at block 902 may be transmitted to the server 106 so that the server 106 performs blocks 908-914. While these alternative embodiments could allow for personal information, such as people's names, to be sent to the server 106, allowing the server 106 to handle these portions of the method 900 could be done to reduce the processing power used by the electronic device 101.

Additionally, in some embodiments, instead of searching only the personal database 204 for entities, the search could be performed using a larger database, such as a large knowledge base stored on the electronic device 101 or the server 106. For example, the knowledge base could be a routinely-updated knowledge base that contains various named entities learned over time and their entity types (such as movie titles, artist names, etc.) that are or become well-known and are added to the knowledge base using automated or manual processes.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
receiving, by at least one processing device of an electronic device, an utterance provided by a user;
delexicalizing, by the at least one processing device, at least a portion of the utterance using a named entity database stored on the electronic device to create an encoded utterance;
transmitting, by the at least one processing device using a communications interface of the electronic device, the encoded utterance to a server on which a language model is stored;
receiving, by the at least one processing device using the communications interface, an intent and one or more slots associated with the utterance, wherein at least one slot of the one or more slots is a representative tag;
identifying, by the at least one processing device, a named entity corresponding to the at least one slot based on the named entity database; and
performing, by the at least one processing device, an action based on the intent and the one or more slots.

2. The method of claim 1, wherein the named entity database comprises regular expressions for description of a plurality of named entities.

3. The method of claim 1, wherein delexicalizing at least the portion of the utterance comprises encoding, by the at least one processing device, the utterance by replacing one or more named entities in the utterance with the representative tag corresponding to a named entity category determined using the named entity database.

4. The method of claim 1, wherein the language model is trained to output an embedding vector representing the encoded utterance for identifying the intent and the one or more slots associated with the utterance.

5. The method of claim 4, further comprising training the language model, wherein training the language model comprises:
accessing a training dataset comprising a plurality of utterances;
generating additional training samples for the training dataset by replacing each of one or more named entities in the plurality of utterances with the representative tag corresponding to a named entity category; and
teaching the language model using the training dataset to perform a masked entity prediction task to predict masked named entities and masked representative tags in the training dataset.

6. The method of claim 5, wherein the named entity category comprises one of a plurality of categories, the plurality of categories comprising at least one of: a person category, an object category, a location category, and a time category.

7. The method of claim 5, wherein the language model is trained to predict the masked representative tags during a fine-tuning phase of training.

8. The method of claim 4, wherein the language model is pre-trained with datasets incorporating natural textual data derived from at least one network-connected resource.

9. An electronic device comprising:
at least one processing device configured to:
receive an utterance provided by a user;
delexicalize at least a portion of the utterance using a named entity database stored on the electronic device to create an encoded utterance;
transmit, using a communications interface of the electronic device, the encoded utterance to a server on which a language model is stored;
receive, using the communications interface, an intent and one or more slots associated with the utterance, wherein at least one slot of the one or more slots is a representative tag;
identify a named entity corresponding to the at least one slot based on the named entity database; and
perform an action based on the intent and the one or more slots.

10. The electronic device of claim 9, wherein the named entity database comprises regular expressions for description of a plurality of named entities.

11. The electronic device of claim 9, wherein, to delexicalize at least the portion of the utterance, the at least one processing device is configured to encode the utterance by replacing one or more named entities in the utterance with the representative tag corresponding to a named entity category determined using the named entity database.

12. The electronic device of claim 9, wherein the language model is trained to output an embedding vector representing the encoded utterance for identifying the intent and the one or more slots associated with the utterance.

13. The electronic device of claim 12, wherein, to train the language model, the server is configured to:
access a training dataset comprising a plurality of utterances;
generate additional training samples for the training dataset by replacing each of one or more named entities in the plurality of utterances with the representative tag corresponding to a named entity category; and
teach the language model using the training dataset to perform a masked entity prediction task to predict masked named entities and masked representative tags in the training dataset.

14. The electronic device of claim 13, wherein the named entity category comprises one of a plurality of categories, the plurality of categories comprising at least one of: a person category, an object category, a location category, and a time category.

15. The electronic device of claim 13, wherein the language model is trained to predict the masked representative tags during a fine-tuning phase of training.

16. The electronic device of claim 12, wherein the language model is pre-trained with datasets incorporating natural textual data derived from at least one network-connected resource.

17. A non-transitory machine readable medium containing instructions that when executed cause at least one processor of an electronic device to:
receive an utterance provided by a user;
delexicalize at least a portion of the utterance using a named entity database stored on the electronic device to create an encoded utterance;
transmit, using a communications interface of the electronic device, the encoded utterance to a server on which a language model is stored;
receive, using the communications interface, an intent and one or more slots associated with the utterance, wherein at least one slot of the one or more slots is a representative tag;
identify a named entity corresponding to the at least one slot based on the named entity database; and
perform an action based on the intent and the one or more slots.

18. The non-transitory machine readable medium of claim 17, wherein the named entity database comprises regular expressions for description of a plurality of named entities.

19. The non-transitory machine readable medium of claim 17, wherein the instructions that when executed cause the at least one processor to delexicalize at least the portion of the utterance comprise:
instructions that when executed cause the at least one processor to encode the utterance by replacing one or more named entities in the utterance with the representative tag corresponding to a named entity category determined using the named entity database.

20. The non-transitory machine readable medium of claim 17, wherein the language model is trained to output an embedding vector representing the encoded utterance for identifying the intent and the one or more slots associated with the utterance.

* * * * *